(12) United States Patent
Ray et al.

(10) Patent No.: US 10,995,968 B2
(45) Date of Patent: May 4, 2021

(54) SYSTEMS AND METHODS FOR PROVIDING AIRFLOW IN FURNACE SYSTEMS

(71) Applicant: Johnson Controls Technology Company, Auburn Hills, MI (US)

(72) Inventors: Elton D. Ray, Wichita, KS (US); Bennie D. Hoyt, Benton, KS (US)

(73) Assignee: Johnson Controls Technology Company, Auburn Hills, MI (US)

(*) Notice: Subject to any disclaimer, the term of this patent is extended or adjusted under 35 U.S.C. 154(b) by 148 days.

(21) Appl. No.: 16/122,721

(22) Filed: Sep. 5, 2018

(65) Prior Publication Data

US 2020/0064009 A1 Feb. 27, 2020

Related U.S. Application Data

(60) Provisional application No. 62/720,795, filed on Aug. 21, 2018.

(51) Int. Cl.
| | |
|---|---|
| F24F 11/00 | (2018.01) |
| F24F 11/77 | (2018.01) |
| F24F 11/88 | (2018.01) |
| F24H 9/20 | (2006.01) |
| F24H 3/02 | (2006.01) |
| F24F 140/10 | (2018.01) |

(52) U.S. Cl.
CPC .............. *F24F 11/77* (2018.01); *F24F 11/88* (2018.01); *F24H 3/02* (2013.01); *F24H 9/2064* (2013.01); *F24F 2140/10* (2018.01)

(58) Field of Classification Search
CPC .. F24F 11/72; F24F 11/74; F24F 11/75; F24F 11/77; F24F 11/88
See application file for complete search history.

(56) References Cited

U.S. PATENT DOCUMENTS

| | | |
|---|---|---|
| 9,119,979 B2 | 9/2015 | Curran et al. |
| 9,692,347 B2 | 6/2017 | Hung et al. |
| 9,835,350 B2 | 12/2017 | Hu |
| 2010/0076606 A1 | 3/2010 | Gatley et al. |
| 2010/0256821 A1 | 10/2010 | Jeung et al. |
| 2012/0199109 A1 | 8/2012 | Thompson |
| 2019/0128549 A1* | 5/2019 | Kupferberg ............... F24F 11/47 |
| 2019/0331123 A1* | 10/2019 | Yang ......................... F24F 11/77 |
| 2019/0383486 A1* | 12/2019 | Maiello .................... F23N 1/022 |

* cited by examiner

*Primary Examiner* — Paul B Yanchus, III
(74) *Attorney, Agent, or Firm* — Fletcher Yoder, P.C.

(57) ABSTRACT

A heating system, includes a furnace that is configured to heat air to be provided to a conditioned space, a pressure sensor configured to collect sensor data indicative of a pressure of air within the furnace; a fan configured to supply the heated air to the conditioned space, and a motor configured to drive the fan. Additionally, the heating system includes processing circuitry communicatively coupled to the pressure sensor and the motor. The processing circuitry is configured to control the motor based upon the sensor data such that an amount of airflow supplied to the conditioned space is constantly supplied by the fan.

28 Claims, 7 Drawing Sheets

SYSTEMS AND METHODS FOR PROVIDING AIRFLOW IN FURNACE SYSTEMS

CROSS-REFERENCE TO RELATED APPLICATIONS

This application is a U.S. Non-Provisional application claiming priority to and the benefit of U.S. Provisional Application No. 62/720,795, entitled "SYSTEMS AND METHODS FOR PROVIDING AIRFLOW IN FURNACE SYSTEMS," filed Aug. 21, 2018, which is hereby incorporated by reference in its entirety for all purposes.

BACKGROUND

The present disclosure relates generally to heating, ventilating, and air conditioning (HVAC) systems. A wide range of applications exist for HVAC systems. For example, residential, light commercial, commercial, and industrial HVAC systems are used to control temperatures and air quality in residences and other buildings. Certain HVAC units can be dedicated to either heating or cooling, although many HVAC units are capable of performing both functions. HVAC units may also provide ventilation to a conditioned interior space. In general, HVAC systems operate by implementing a thermodynamic cycle in which a refrigerant undergoes alternating phase changes to remove heat from or deliver heat to a conditioned interior space of a building. Heating may also be provided by heat pumps, gas furnace heat exchangers, electric resistance heat, or steam or hot water coils. Similar systems are used for vehicle cooling, and as well as for other types of general refrigeration, such as refrigerators, freezers, and chillers.

Certain HVAC systems may include an air handler that is driven by a motor and provides conditioned air to a conditioned space. In some cases, the motor may not be configured to cause the fan to supply a constant amount of airflow to the conditioned space. As such, the conditioned space may be oversupplied or undersupplied with conditioned air provided by the HVAC system. In other cases, certain types of motors, such as constant airflow motors, which may also be called constant CFM motors, typically require measuring a speed of a motor that drives the air handler.

SUMMARY

The present disclosure relates to a heating system that includes a furnace that is configured to heat air to be provided to a conditioned space, a pressure sensor configured to collect sensor data indicative of a pressure of air within the furnace, a fan configured to direct the heated air to the conditioned space, and a motor configured to drive the fan. Additionally, the HVAC system includes processing circuitry communicatively coupled to the pressure sensor and the motor. The processing circuitry is configured to control the motor based upon the sensor data such that an amount of airflow supplied to the conditioned space is constantly supplied by the fan.

The present disclosure also relates to a control board for a furnace that includes processing circuitry configured to be communicatively coupled to a pressure sensor and a motor that are each disposed within a blower compartment of the furnace, wherein the processing circuitry is configured to receive data from the pressure sensor and control the motor based on sensor data such that a blower driven by the motor supplies a constant amount of air to a conditioned space.

The present disclosure further relates to a computer-readable medium that includes instructions configured to cause a processor to receive data indicative of a pressure of air within a cabinet of a furnace from a pressure sensor, receive an amount of airflow from a control device, and determine electrical settings based on the amount of airflow and the data. Additionally, the instructions are configured to cause the processor to adjust an operating speed of a constant torque brushless direct current motor to be supplied with electric power having the electrical settings such that fan driven by the motor supplies a constant amount of airflow to a conditioned space.

DETAILED DESCRIPTION

The present disclosure is directed to HVAC systems having a furnace or furnace system that provides a constant amount of air to a conditioned space. As discussed below, the HVAC systems may include a furnace that includes a fan motor or air blower motor that may be controlled based on data gathered from a pressure sensor associated with a cabinet or compartment of the furnace such as a blower compartment to provide a constant airflow. More specifically, a motor associated with a blower of a furnace may be controlled based on data from a pressure sensor such that the blower may provide a constant flow of air across a heat exchanger of the furnace, which may become heated and supplied to the conditioned space. By providing a constant airflow to the heated or conditioned space, the furnace system discussed below may operate with improved energy efficiency. It should be noted that reference to "constant" amounts of air or airflow and "constantly" providing an amount of air or airflow includes providing the same measureable amount of air or airflow over a given period of time as well as providing generally persistent amounts of air or overflow over a given period of time. For instance, as described below, when a change in pressure is detected, which may correspond to a change in an amount of airflow, an operation of a motor associated with a fan that provides the airflow may be adjusted so that the fan provides an airflow generally the same (within a measureable limit) as the original amount of airflow. Accordingly, reference to "constant" amounts of air or airflow and "constantly" providing an amount of air or airflow may include more than one amount of air or airflow, and is not limited to one exact amount of air or airflow.

Figure 1:
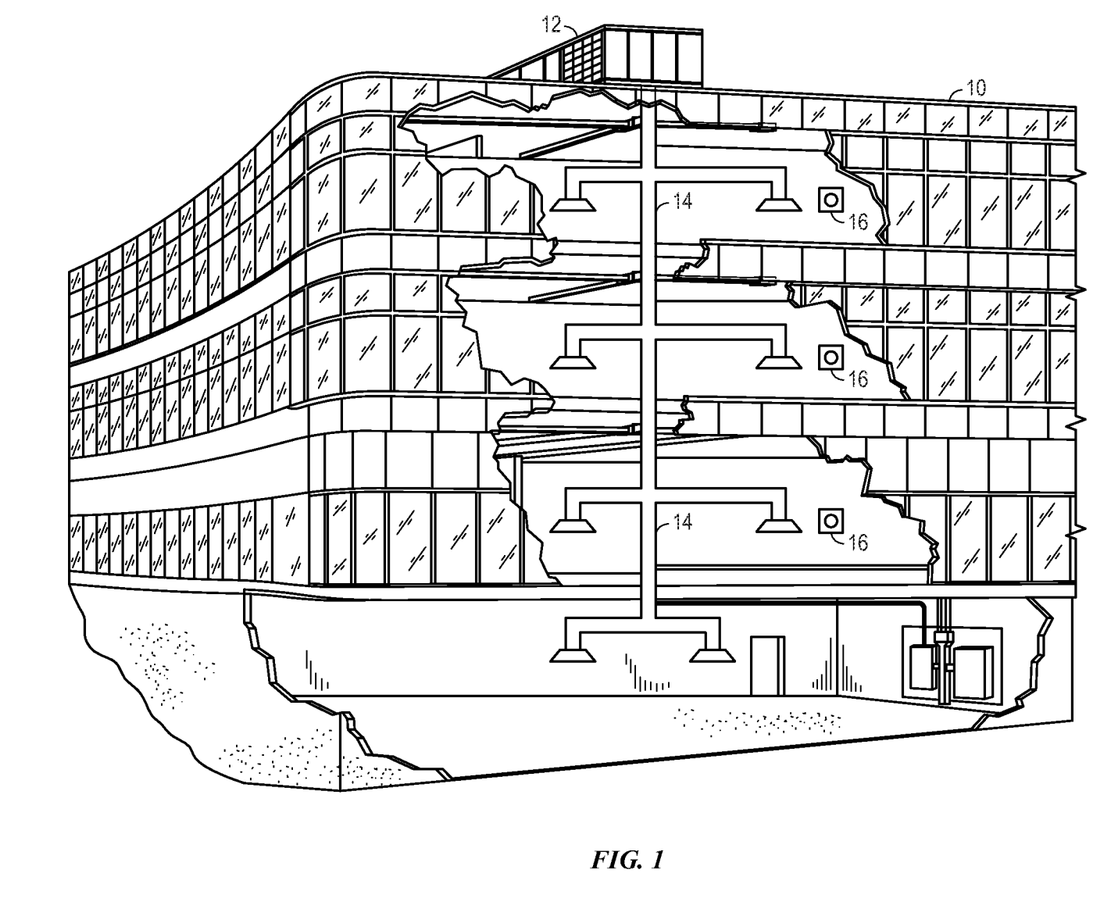
FIG. 1 is a perspective view a heating, ventilating, and air conditioning (HVAC) system for building environmental management, in accordance with embodiments described herein.

Turning now to the drawings, FIG. 1 illustrates a heating, ventilation, and air conditioning (HVAC) system for building environmental management that may employ one or more HVAC units. In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
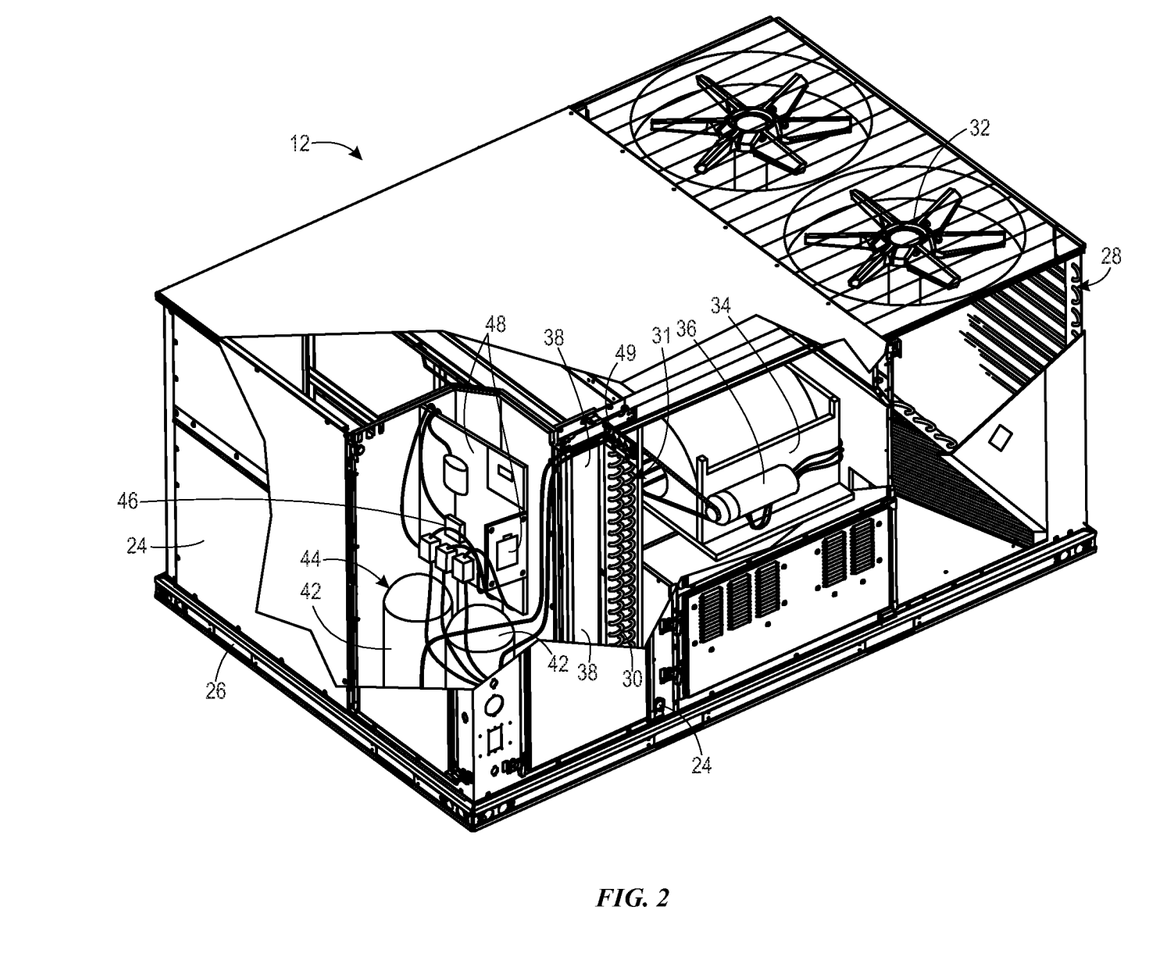
FIG. 2 is a perspective view of the HVAC unit of the HVAC system of FIG. 1, in accordance with embodiments described herein.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
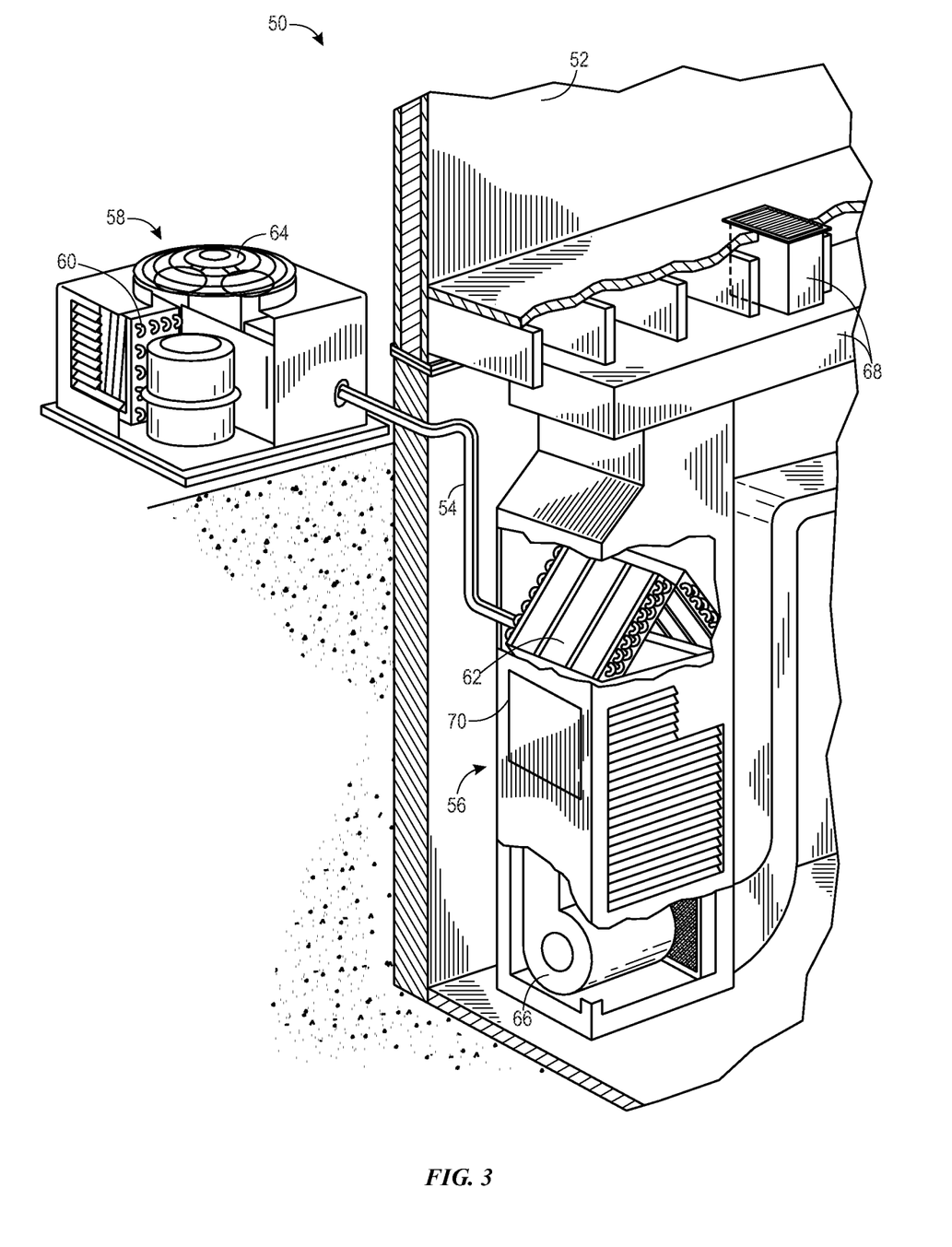
FIG. 3 is a perspective view of a residential HVAC system, in accordance with embodiments described herein.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or a set point plus a small amount, the residential heating and cooling system 50 may become operative to refrigerate additional air for circulation through the residence 52. When the temperature reaches the set point, or a set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70, which may also be referred to as a heating system, may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
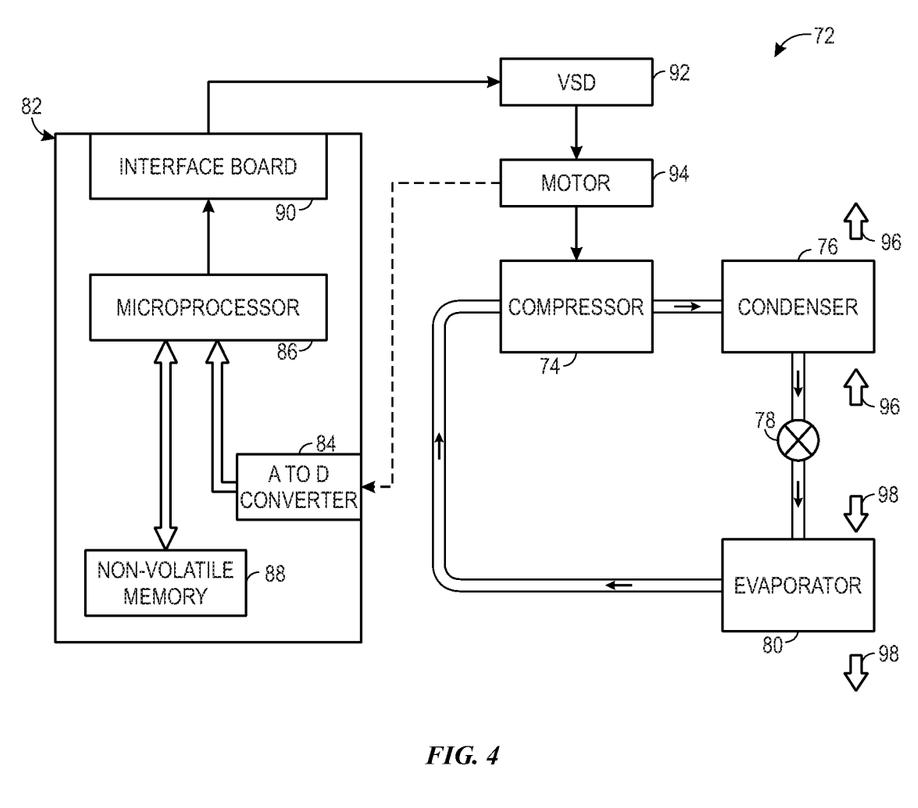
FIG. 4 is a schematic diagram of a vapor compression system that may be used in the HVAC system of FIG. 2 and the residential HVAC system FIG. 3, in accordance with embodiments described herein.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

As discussed below, the HVAC systems may include a furnace that includes a fan motor or air blower motor that may be controlled based on data gathered from a pressure sensor associated with a cabinet or compartment of the furnace, such as a blower compartment, to provide a constant airflow. More specifically, a motor associated with a blower of a furnace may be controlled based on data from a pressure sensor such that the blower may provide a constant flow of air across a heat exchanger of the furnace, which will be heated and may be supplied to a heated space. Furthermore, while the discussion below relates to furnaces that may be included in residential settings, such as the furnace system 70 of the residential heating and cooling system 50, it should be noted that the furnaces discussed below may be utilized in the HVAC unit 12 as well. By providing a constant airflow to the heated or conditioned space, the furnace system discussed below may operate with higher energy efficiency compared to furnace systems that do not employ the presently disclosed techniques.

Figure 5:
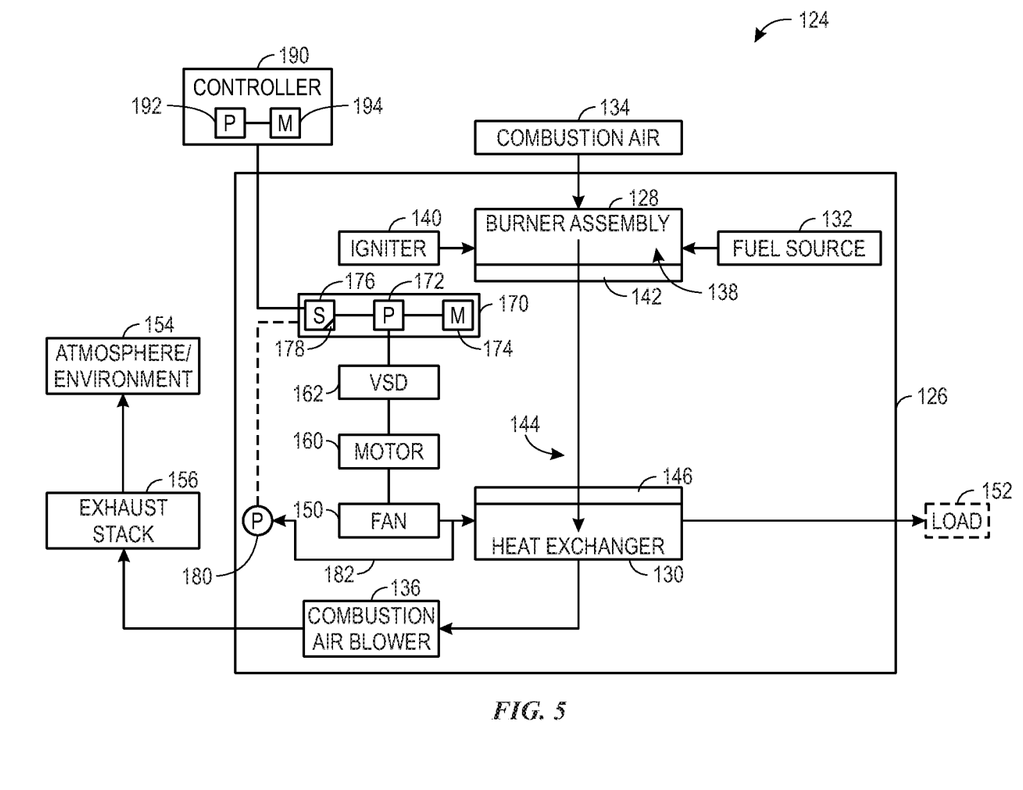
FIG. 5 is a block diagram of a furnace system, in accordance with embodiments described herein.

Keeping the discussion of the furnace system 70 in mind, FIG. 5 illustrates a block diagram of a furnace system 124 that may be included in the residential heating and cooling system 50. For instance, in some embodiments, the furnace system 124 may be included in the furnace system 70. However, it should be noted that the furnace system 124 may also be included in other HVAC systems and units, such as those used in commercial or industrial settings. The furnace system 124 includes a housing 126 that includes a burner assembly 128 and a heat exchanger 130 inside the housing 126. Depending on the embodiment, the burner assembly 128, the heat exchanger 130, and other components of the housing 126 may be housed in separate housings, separate portions of the housing 126, or in a single portion of the housing 126. Additionally, the various components of the furnace system 124 may be coupled to a surface of the housing 126, whether external or internal to the housing 126.

A fuel source 132 provides fuel to individual burners within the burner assembly 128. The fuel may include natural gas, liquefied petroleum gas, fuel oil, coal, wood, or the like. Air, or some other oxidant, is also provided to the burners in the burner assembly 128 from an oxidant or combustion air source 134. For example, combustion air from the combustion air source 134 may be drawn into each individual burner of the burner assembly 128 to mix with the fuel drawn into each individual burner of the burner assembly 128. The combustion air source 134 may be a container with compressed oxidant (e.g., compressed air), or the combustion air source 134 may be an atmosphere within or surrounding the HVAC unit 12. For example, the combustion air source 134 may be an area within the burner assembly 128 external to the individual burners of the burner assembly 128. In some embodiments, the air may be motivated from an area proximate the burners into the burners of the burner assembly 128 via a pressure difference generated by a combustion air blower 136, which may also be responsible for drawing combustion products through the heat exchanger 130. In other words, a flow path exists between the burners of the burner assembly 128 and the combustion air blower 136, such that the combustion air blower 136 assists in both drawing oxidant into the burners of the burner assembly 128 and drawing combustion products through the flow path between the combustion air blower 136 and the burner assembly 128. The oxidant, as previously described, mixes with the fuel in the burners to form a combustible mixture, which may be referred to herein as "the mixture." The mixture may be ignited in a primary combustion zone 138 of the burner assembly 128 via an igniter 140, where the primary combustion zone 138 refers to all the zones in each of the burners together. For example, an embodiment including four burners may include four total zones with one zone within each burner, and all four zones together are cumulatively referred to as the primary combustion zone 138.

An electrical pulse, such as a signal, may be sent through the igniter 140 to instruct the igniter 140 to produce a spark adjacent to or within the burners of the burner assembly 128. In some embodiments, a spark may be provided to the primary combustion zone 138 of each burner of the burner assembly 128, such that the mixture within each burner is ignited. In other embodiments, the mixture may be ignited by other means, such as a hot surface igniter or a pilot light flame.

Once ignited, the mixture in the primary combustion zone 138 burns and forms combustion products. The combustion products, along with a flame, may exit the burners of the burner assembly 128 and passes through openings 142 of the burner assembly 128 that may be positioned downstream of the burners within the burner assembly 128. Additional combustion air may be provided to the flame for enhanced combustion downstream of the openings 142 via a secondary combustion air gap 144.

The secondary combustion air may be pulled into the path of the flame from the secondary combustion air gap 144 via a pressure difference generated by the combustion air blower 136. Upon combustion, combustion products and/or a corresponding flame may pass through the openings 142. Secondary combustion air may then be provided from the secondary combustion air gap 144, for example, via the combustion air blower 136, for additional combustion downstream of the openings 142. It should be noted that a space may exist between the outlets of the individual burners of the burner assembly 128 and the openings 142 of the burner assembly 128, and that secondary combustion may take place within this space even before the flame and/or combustion products pass through the opening 142. In other words, secondary combustion may take place upstream of the openings 142, downstream of the openings 142, or a combination thereof.

The openings 142 may generally be aligned with openings of tubes of the heat exchanger 130. In some embodiments, the openings 142 are also aligned with openings in a panel 146 that may be coupled to the tubes of the heat exchanger 130, in which case the panel 146 may be positioned between the openings 142 and the tubes of the heat exchanger 130. Although the boundaries along the openings 142 may not be directly coupled with or otherwise engaging the tubes, the openings 142 may be generally aligned to facilitate flow of combustion products therethrough. During operation, the combustion products may pass through the openings 142 and extend into and through the tubes of the heat exchanger 130 via entry into openings of the panel 146.

A fan 150, such as an air blower or some other flow-motivating device, may force air over the tubes in the heat exchanger 130 to generate a heated medium by transferring heat from the combustion products to the air. In some embodiments, the fan 150 may be the same as the blower or fan 66 of FIG. 3. The fan 150 operates to motivate air over the tubes to generate heated air, and the heated air may be exported to a load 152, such as a room, for heating the load 152. It should be noted that the fan 150, in some embodiments, may be a separate component from the heat exchanger 130 and may blow air across the heat exchanger 130 to generate the heated air. In another embodiment, the fan 150 may be located inside the heat exchanger 130 (e.g., as a combined component) and may operate to blow the air directly over the tubes of the heat exchanger 130, as previously described. Further, it should be noted that the fan 150 may reside in any appropriate portion of the heat exchanger 130. For example, the fan 150 may be at a bottom of the heat exchanger 130 and blow air upwards over the tubes, the fan 150 may be at the left or right of the heat exchanger 130 and blow air cross-wise over the tubes, or the fan 150 may be at the top of the heat exchanger 130 and blow air downwards over the tubes. Further still, the fan 150 may be a mechanical fan, a centrifugal fan, or some other type of fan.

Combustion products passing through the tubes of the heat exchanger 130 may be motivated through the tubes via the combustion air blower 136. Indeed, the combustion air blower 136 may generate a pressure difference between an area surrounding the burner assembly 128 and a flow path from the burner assembly 128 to an external environment 154. In other words, the combustion air blower 136 may draw air into the burners of the burner assembly 128, draw the combustion products from the burners of the burner assembly 128 into the tubes of the heat exchanger 130, and draw the combustion products through the tubes of the heat exchanger 130. Additionally, the combustion air blower 136 may be configured to pull the combustion products from the heat exchanger 130 and blow the combustion products into an exhaust stack 156 of the furnace system 124, which may be configured to export the combustion products from the furnace system 124 into the external environment 154 or another area external to the furnace system 124.

The fan 150, which may motivate air to pass across the tubes of the heat exchanger 130, may be driven by a motor 160. The motor 160 may be powered directly from an AC or DC power source. However, in some embodiments, the motor 160 may be powered by a variable speed drive (VSD) 162, which may receive AC power having a particular fixed line voltage and fixed line frequency from an AC power source and provide power having a variable voltage and frequency to the motor 160. The motor 160 may include any type of electric motor that can be powered by a VSD or directly from an AC or DC power source, such as a switched reluctance motor, an induction motor, an electronically commutated permanent magnet motor, or another suitable motor. For example, in some embodiments, the motor 160 may be a brushless DC (BLDC) motor constant torque motor.

The furnace system 124 may also include a control board 170 that may include processing circuitry 172, memory 174, and storage 176. The processing circuitry 172 may include one or more microprocessors or other integrated circuits. Additionally, the memory 174 may be non-volatile memory, and the storage 176 may store data associated with the furnace system 124. For example, the storage 176 may include an application 178 that may be executed by the processing circuitry 172 to control the motor 160. However, in other embodiments, the application 178 may be stored on the memory 174. As described below, the control board 170 and its components may function to regulate operation of the furnace system 124 based on feedback from a sensor 180 that is communicatively coupled to the control board 170. Using the sensor 180 feedback as a mechanism to regulate operation of the furnace system 124 may enable the control board 170 to regulate operation of the motor 160 such that the fan 150 constantly provides an amount of airflow consistent with a desired amount of airflow that may be determined by a control device 190, which may be a thermostat.

The sensor 180 may be a pressure sensor such as a pressure transducer that may collect data regarding a pressure of air within a specific area within the furnace system 124, such as a cabinet of the furnace system 124 that includes the fan 150. In other embodiments, the sensor 180 may collect data regarding an airflow generated by the fan 150 or be utilized to measure a difference in pressure between two areas of the furnace system 124, such as an area upstream of the fan 150 and an area downstream of the fan 150. For instance, the sensor 180 may measure a difference in pressure between a cabinet of the furnace system 124 through which air is provided to the fan 150 and an area downstream of the fan 150, such as a portion of the furnace system 124 through which air motivated by the fan 150 passes. The area downstream of the fan 150 may be upstream of the heat exchanger 130 or another heat exchanger that may be associated with the furnace system 124, such the heat exchanger 62 of FIG. 3. For instance, the fan 150 may motive air past the heat exchanger 130, and the air may subsequently pass across or through the heat exchanger 62 before entering ductwork, such as the ductwork 68 of FIG. 3. In embodiments in which a pressure downstream of the fan 150 is measured, a conduit, such as a hose 182, may fluidly connect the area downstream of the fan 150 to the sensor 180 and enable the sensor 180 to measure the pressure of the downstream area. Alternatively, in other embodiments, the sensor 180 may be disposed in the downstream area. For instance, the sensor 180 may be disposed between the fan 150 and the heat exchanger 130 or between the fan 150 and another heat exchanger that may be associated with the furnace system 124, such the heat exchanger 62 of FIG. 3. Furthermore, in embodiments in which a pressure difference is measured, more than one sensor 180 may be included in the furnace system 124. For instance, a sensor 180 may be included upstream of the fan 150, such as in a blower cabinet of the furnace system 124, and another sensor 180 may be included downstream of the fan 150, such as between the fan 150 and the heat exchanger 130 or between the fan 150 another heat exchanger that may be associated with the furnace system 124, such the heat exchanger 62 of FIG. 3. The processing circuitry 172 may determine the difference in pressure between the pressures indicated the sensors 180.

The sensor 180 may send the collected information via sensor data and measurement signals to the processing circuitry 172 of the control board. The processing circuitry 172 may receive and process the sensor data and measurement signals from the sensor 180, and the processing circuitry 172 may control the operation of the motor 160 based on the information collected by the sensor 180. For example, the processing circuitry 172 may execute instructions stored on the memory 174 or storage 176, such as the application 178, to receive the pressure data or measurement signals from the sensor 180. The application 178 may include a look-up table or other data that correlates data provided by the sensor 180 to settings associated with the motor 160. For example, the application 178 may include a look-up table indicating electrical settings such as a voltage, frequency, current or a combination thereof of electric power that should be provided to the motor 160 for data or electrical signals received from the sensor 180. In other words, pressure measurements from only a single sensor, the sensor 180, may be associated with specific electrical settings that should be provided to the motor 160, and the application 178 may include data defining which electrical settings should be used for a particular input from the sensor 180.

Utilizing the application 178, the processing circuitry 172 may process the data and signals received from the sensor 180 to control the motor 160. For example, for a given electrical signal or set of data received from the sensor 180, the processing circuitry 172 may determine electrical settings of the electricity that should be supplied to the motor 160 based on the application 178. The processing circuitry 172 may also cause the motor 160 to operate with the determined electrical settings. For instance, the processing circuitry 172 may send signals to the VSD 162 to modify a current, voltage, and/or frequency, of electricity provided to the motor 160. Modifying the electrical settings of the electric power supplied to the motor 160 may cause the operation of the motor 160 to change. For instance, the speed of the motor 160, such as a value in revolutions per minute (RPM), may increase or decrease in response to a change in the electrical settings of the electric power provided to the motor 160. As discussed below, the speed of the motor 160 may be adjusted such that an airflow provided by the furnace system 124 may be maintained at a constant level.

The control board 170 may be communicatively coupled to the control device 190 that may be located in an area associated with the load 152. For example, the control device 190 may be located inside of a building that is supplied with heated air provided by the furnace system 124. The control device 190 may be a thermostat that may be used to designate the temperature of the heated air as well as the flow of air provided to the load 152. For instance, a user may be able manage temperature and fan settings associated with an HVAC system, such as the furnace system 124, that supplies the load 152 with heated or conditioned air. The control device 190 may also determine an amount of airflow to be provided to the load 152, such as a volume of air provided in an amount of time definable in units of cubic feet per minute (CFM), based on a designated temperature, flow of air, fan setting, or a combination thereof. For instance, the control device 190 may include a processor 192 that executes instructions stored on non-volatile memory 194 to determine the amount of airflow.

Moreover, the control device 190 may send the amount of airflow to the processing circuitry 172. The processing circuitry 172 may control the motor 160 based on the amount of airflow and the data provided from the sensor 180. For instance, for a particular amount of airflow called for by the control device 190, an expected pressure or value related to an expected pressure, such as data provided by the sensor 180, may be defined in the application 178. For example, the application 178 may include a look-up table or other data that defines an expected pressure or value for amounts of airflow that may be provided by the furnace system 124. The processing circuitry 172 executing the application 178 may determine the expected pressure as well as a measured pressure based on the data from the sensor 180. The processing circuitry 172 may compare the measured pressure, as indicated by the sensor 180, to the expected pressure. For example, the processing circuitry 172 may determine whether the measured pressure is within a threshold amount of being equivalent to the desired pressure. In other words, the pressure sensor 180 may be the only sensor utilized to determine a measured pressure that may be compared to the expected pressure. Moreover, in embodiments in which a sensor data is indicative of a difference in pressure, the application 178 may define expected differences in pressure for particular amounts of airflow, and the processing circuitry 172 may compare a measured difference in pressure to an expected difference. For instance, the processing circuitry 172 may determine whether the measured pressure difference is within a threshold of the expected pressure difference.

In either case of when a pressure value or a difference in pressure is utilized, when the utilized value is not within a threshold of an expected value, the processing circuitry 172 may cause an adjustment to the operation of the motor 160 to be made, for example, via pulse width modulation of an electric signal provided to the motor 160. For instance, the processing circuitry 172 may cause the motor 160 to operate at a different speed, which may cause the fan 150 to operate at a different speed, which may cause the amount of airflow provided by the fan 150 to change. In other words, when the measured pressure or measured pressure difference differs from the expected pressure or expected pressure difference, respectively, the processing circuitry 172 may adjust operation of the motor 160, which in turn will adjust the speed of the fan 150 as well as the amount of airflow provided by the fan 150. For instance, when the measured pressure is not within a threshold of the expected pressure, the processing circuitry 172 may determine electrical settings specific to a particular amount of airflow, such as an amount of airflow determined by the control device 190, and the expected pressure. In other words, the application 178 may define electrical settings associated with electric power that should be supplied to the motor 160 to adjust the speed of the motor 160 so that the measured pressure is the same or similar to the expected pressure. The processing circuitry 172, executing the application 178, may determine the electrical settings of the electric power to be provided to the motor 160 and cause electric power with the determined electrical settings to be provided to the motor 160. For example, if the processing circuitry 172 determines that the measured pressure is too low, the processing circuitry 172 may send a signal or command to vary a voltage, current, or frequency of electric power supplied to the motor 160 by the VSD 162, which may increase the speed of the motor 160. Increasing the speed of the motor 160 may alter the speed of the fan 150, which may then increase an amount of airflow provided by the fan 150 as well as the pressure indicated by the sensor 180.

By adjusting the electrical settings of the electric power provided to the motor 160, the speed of the motor 160 may be modified so that the fan 150 provides conditioned air to the load 152 in accordance with the amount of airflow determined by the control device 190. Furthermore, as the amount of airflow, the air pressure measured by the sensor 180, or both change, the processing circuitry 172, based on the application 178, may change the electrical settings associated with the electric power provided to the motor 160 so that the fan 150 provides enough air to provide the desired amount of airflow. In this manner, the furnace system 124 may provide a constant amount of airflow. For instance, if an amount of airflow is called for at a first time, the processing circuitry 172 may determine that a pressure indicated by the sensor 180 differs from an expected pressure associated with the amount of airflow. Accordingly, the processing circuitry 172 may set the speed of the motor 160 to a first speed so that the fan 150 provides the requested amount of airflow. At a second time, such as when the amount of airflow requested is the same, but the pressure of air within the housing 126 has changed, the processing circuitry 172 may adjust the speed of the motor 160 to a second speed so that the fan 150 continues to supply the requested amount of airflow.

The furnace system 124 may also determine total external static pressure of the system in which the furnace system 124 is included. Static pressure refers to the resistance to airflow in an HVAC system. For example, resistance may be introduced, among other things, by ductwork, air filters, and components of HVAC units included in an HVAC system. As used herein, total external static pressure refers to the portion of static of pressure that is caused by the portions of an HVAC system other than portions of the furnace system 124 associated with the fan 150. More specifically, total external static pressure may be indicative of the static pressure introduced to an HVAC system by any portion of the HVAC system other than a portion of the HVAC system that may be defined as an area between where air exits the furnace system 124 and where return air enters the furnace system 124. In other words, total external static pressure may account for static pressure introduced by, among other things, ductwork and/or an air filter that filters return air For instance, as described above, a pressure downstream of the fan 150 but upstream of a heat exchanger that may be utilized to cool air supplied by the fan, such as the heat exchanger 62 of FIG. 3, may be measured by a sensor 180. Additionally, a pressure within the furnace system 124 upstream of the fan 150 may be measured by a sensor 180. Based on the two measured pressure values, the processing circuitry 172 may determine the total external static pressure of the HVAC system in which the furnace system 124 is included. For example, the processing circuitry 172 may calculate a difference between the two pressure values to make such a determination.

Moreover, the processing circuitry 172 may determine a pressure associated with a portion of the HVAC system downstream of the heat exchanger 130 and or another heat exchanger that may be associated with the furnace system 124, such the heat exchanger 62 of FIG. 3, for instance, in the vicinity of the heat exchanger 130 after air has been motivated across the coils of the heat exchanger 130 and coils of the heat exchanger 62. Such a pressure may be determined based on an amount of airflow. For instance, by utilizing pressure measurements obtained from the sensor 180 and by utilizing the application 178, the processing circuitry 172 may determine an amount of airflow associated with a measured pressure, such as a pressure of air between the fan 150 and the heat exchanger 130 or between the fan 150 and the heat exchanger 62. As described above, the application 178 may relate pressure values measured by the sensor 180 to amounts of airflow. Thus, while a pressure value expected for an amount of airflow indicated by the control device 190 may be determined, an amount of airflow may also be determined based on a pressure indicated by the sensor 180. Furthermore, the application 178 may include an algorithm and/or a look-up table relating a measured pressure, an amount of airflow, or both to a pressure value of the portion of the HVAC system that is downstream of the heat exchanger 130 and/or the heat exchanger 62. For instance, for a particular model or type of the furnace system 124 and heat exchanger 62, simulations or experiments may be performed to determine the pressure associated with a portion of the HVAC system downstream of the heat exchanger 130 and/or heat exchanger 62 for various amounts of airflow that may be provided by the furnace system 124. These values may be included in the application 178, for instance, in a look-up table, and the processing circuitry 172 may utilize the look-up table to determine a pressure associated with a portion of the HVAC system downstream of the heat exchanger 130 or heat exchanger 62 based on an amount of airflow that may be determined based on measured pressure data. It should also be noted that the algorithm and/or look-up table may determine the pressure downstream of the heat exchanger 62 based on a specific model of the heat exchanger 62. For example, a user may input the model via the controller 190 or an input device associated with the control board 170. The processing circuitry may determine a look-up table or algorithm specific to the model of the heat exchanger indicated by the user input and utilize the look-up table to determine the pressure downstream of the heat exchanger 62.

Keeping this in mind, the processing circuitry 172 may also determine that total external static pressure based on the data collected by the sensor 180 and the determined pressure downstream of the heat exchanger 62. For example, the processing circuitry 172 may determine the sum of the pressure indicated by the sensor 180 and the pressure determined to be present downstream of the heat exchanger 62. Accordingly, the processing circuitry 172 may utilize the application 178 and the data collected by the sensor 180 to determine a total external static pressure that is indicative of the static pressure introduced by the portions of an HVAC system exclusive of the furnace system 124 or indoor unit of a split HVAC system, such as the indoor HVAC unit 56 of FIG. 3.

Furthermore, based on the pressure determined based on data collected by the sensor 180, the processing circuitry 172 may also determine a pressure drop across the heat exchanger 130 and/or another heat exchanger that may be associated with the furnace system 124, such the heat exchanger 62 of FIG. 3. The pressure drop across the heat exchanger 130 and/or heat exchanger 62 refers to change in pressure as air exits the fan 150 and after the air passes across the heat exchanger 130 and/or the heat exchanger 62. In other words, the pressure drop across the heat exchanger 130 is indicative of the change in pressure caused by the heat exchanger 130 and/or the heat exchanger 62. To determine the pressure drop across the heat exchanger 130 and/or heat exchanger 62, the processing circuitry 172 may determine a difference between a pressure indicated by the sensor 180 and the pressure determined to be present at the portion of the HVAC system downstream of the heat exchanger 130 or heat exchanger 62.

Additionally, each pressure value may be displayed on a display included in the furnace system 124, for instance, on the control board 170 and communicatively coupled to the processing circuitry 172. The pressure values may be displayed in units of inches of water, which may also be referred to as inches water column or inches of water gauge, or another suitable unit. For instance, a pressure determined based on data collected by the sensor 180 may be displayed, as may total external static pressure, a pressure associated with a portion of the HVAC system downstream of the heat exchanger 130 or heat exchanger 62, and/or the pressure drop across the heat exchanger 130 or heat exchanger 62. Furthermore, amounts of airflow, such as an amount of airflow indicated by the control device 190 and an amount of airflow that may be determined based on data from the sensor 180, may also be displayed. As another example, the pressure values and amounts of airflow discussed above may also be displayed via display of the controller 190.

Figure 6:
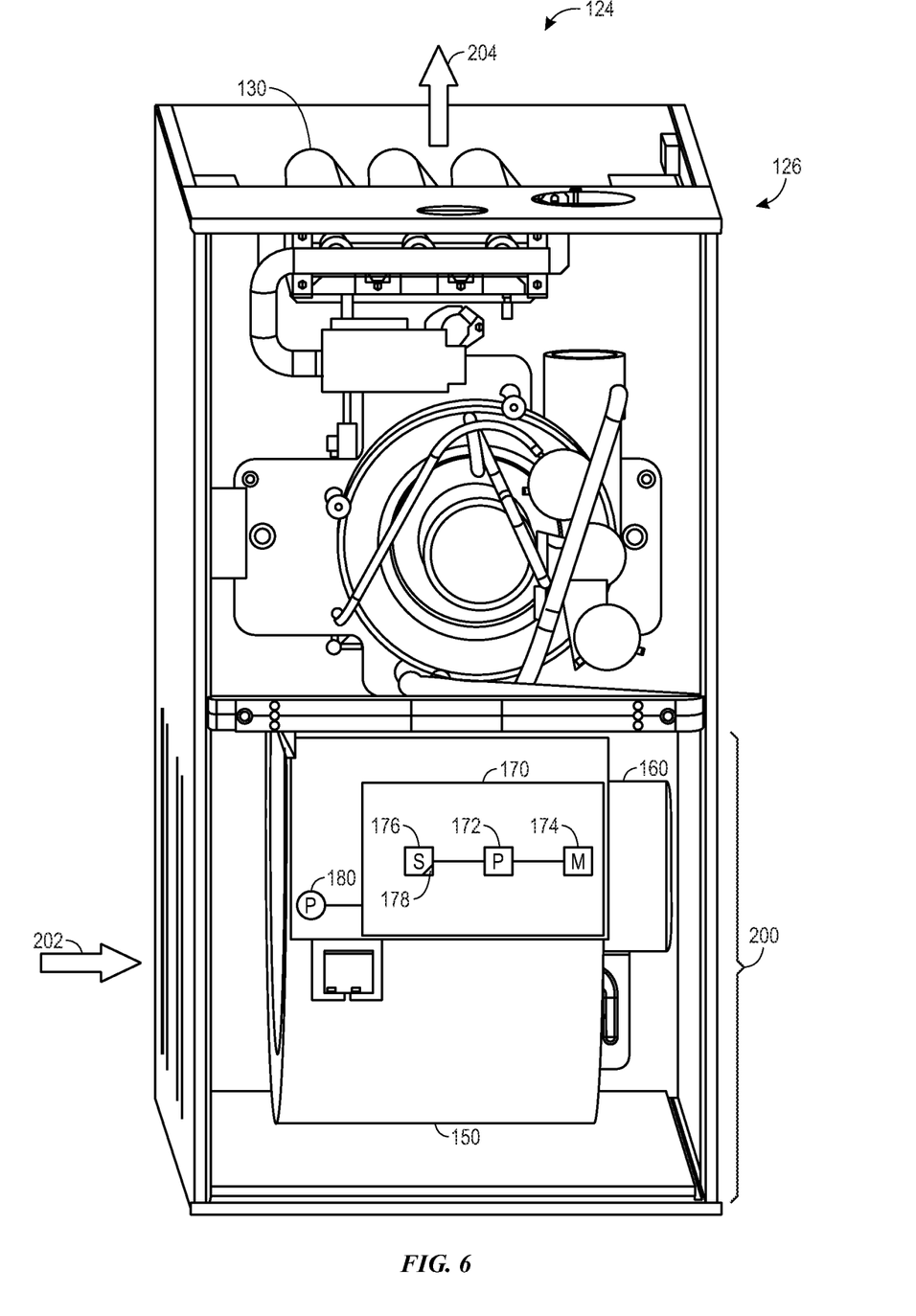
FIG. 6 is a perspective view of the furnace system of FIG. 5, in accordance with embodiments described herein.

Keeping the discussion of FIG. 5 in mind, FIG. 6 is a perspective view of an embodiment of the furnace system 124. As illustrated, the housing 126 of the furnace system 124 includes a cabinet 200, which may be a blower compartment that houses the fan 150, motor 160, the control board 170, and the sensor 180. For example, the cabinet 200 may separate a portion of the furnace system 124 that includes the motor, the control board 170, and sensor 180 from a portion of the furnace system 124 in which air driven by the fan 150 is directed over heat exchangers 130 of the furnace system 124. In the illustrated embodiment, the motor 160 is a constant torque BLDC motor. The housing 126 of the furnace system 124 may include a door that encloses the motor 160, control board 170, and sensor 180 within the cabinet 200. Accordingly, the sensor 180 may send data or signals to the control board 170 indicative of the pressure of the air within the cabinet 200.

For example, return air 202 may be supplied to the furnace system 124 from ductwork, and the fan 150 may cause the return air 202 to be heated by directing the return air 202 across the tubes of the heat exchanger 130, resulting in heated air 204. The heated air 204 may then be provided to a conditioned space, such as the residence 52 of FIG. 3 or the load 152 of FIG. 5, via ductwork.

As the pressure of air, such as return air 202, within the cabinet 200 changes, the processing circuitry 172 may control the speed of the motor 160, such that the fan 150 operates at a speed sufficient to maintain an amount of airflow, such as an amount of heated air 204, provided to a conditioned space. For instance, as described above, the processing circuitry 172 may receive an amount of airflow that the furnace system 124 should supply as well as data or signals from the sensor 180 associated with the pressure of air within a portion of the furnace system 124 such as the cabinet 200 or an area downstream of fan 150 but upstream of the heat exchanger 130 or another heat exchanger that may be associated with the furnace system 124, such as the heat exchanger 62 of FIG. 3. The processing circuitry 172 may also determine that a pressure indicated by the sensor 180 is not within a threshold of an expected pressure associated with the amount of airflow to be supplied. Executing the application 178, the processing circuitry 172 may determine electrical settings associated with electric power to be supplied to the motor 160 and cause the fan 150 to operate at a speed that will enable the fan 150 to provide the requested amount of airflow. The processing circuitry 172 may determine that the requested amount of airflow is being provided when the pressure indicated by the sensor 180 falls within a threshold amount of the expected pressure. Moreover, as discussed above, in embodiments in which a pressure difference is utilized, the processing circuitry 172 may determine whether a measured pressure difference is within a threshold of expected pressure difference, the processing circuitry 172 may control operation of the fan 150 based on such a determination.

Figure 7:
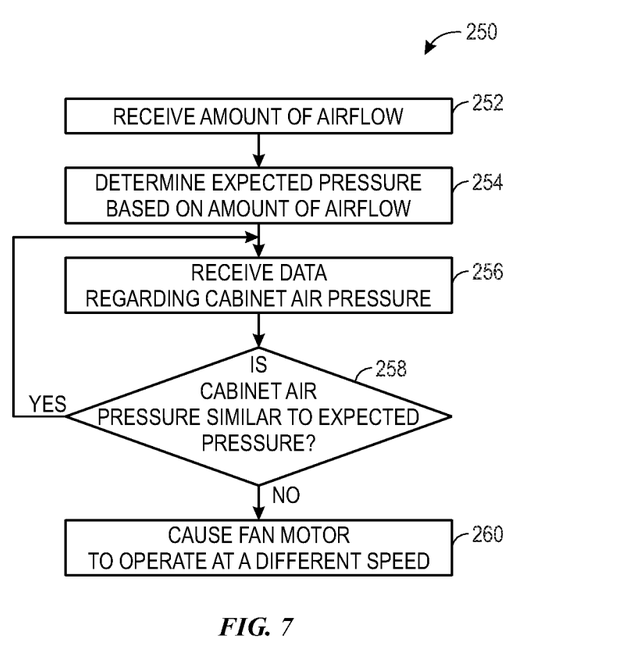
FIG. 7 is a flow diagram of a process for controlling a fan motor in a furnace system, in accordance with embodiments described herein.

Continuing with the drawings, FIG. 7 is a flow diagram of a process 250 for controlling a fan motor in a furnace system, such as furnace system 124. The process 250 may be performed by the processing circuitry 172 executing the application 178 or other instructions provided by the memory 174 or storage 176. Moreover, while the steps of the process 250 are described in a particular order, it should be noted that the steps of the process 250 may be performed in any suitable manner. Furthermore, in certain embodiments, some of the steps described below may not be completed during performance of the process 250.

At block 252, the processing circuitry 172 may receive an amount of airflow. For example, the amount of airflow may be determined and sent to the processing circuitry 172 by a control device 190 that is communicatively coupled to the processing circuitry 172. Additionally, the amount of airflow may be a value that is expressible in units of CFM that corresponds to the amount of airflow to be provided to a conditioned space, such as a building.

At block 254, the processing circuitry 172 may determine an expected pressure based on the amount of airflow. For example, as described above, the application 178 may define an expected pressure associated with various amounts of airflow that a furnace system, such as the furnace system 124, may provide. Accordingly, the processing circuitry, executing the application 178, may determine the expected pressure value based on the amount of the airflow. Moreover, as noted above, in embodiments in which a difference in pressure is to be utilized, the application 178 may provide an expected difference in pressure for a particular amount of airflow.

At block 256, the processing circuitry 172 may receive data regarding a pressure of air. For example, the data may be indicative of a pressure of air within a particular portion of the furnace system, such as the cabinet 200 of the housing 126 of the furnace system 124. For instance, as described above, the processing circuitry 172 may receive the data from a sensor 180 disposed within the cabinet 200. In other embodiments of the process 250, the data may be indicative of a pressure of air at a location between the fan 150 and the heat exchanger 130 of the furnace system 124. Furthermore, as described above, the processing circuitry 172 may also receive data regarding a difference in pressure.

At block 258, the processing circuitry 172 may determine whether an air pressure indicated by the received data is similar to the expected pressure. For example, the processing circuitry 172 may determine whether the measured pressure value is within threshold (e.g., a predetermined value or percentage) of the expected pressure. Similarly, in other embodiments, the processing circuitry 172 may determine whether a difference in pressure is similar to an expected difference in pressure.

When the processing circuitry 172 determines that the measured pressure is similar to the expected pressure, the processing circuitry 172 may continue to receive data regarding a measured air pressure, as indicated by block 256. In other words, when the processing circuitry 172 determines that a measured pressure is similar to an expected pressure, the processing circuitry 172 may continue to monitor the pressure of air indicated by the sensor 180.

However, when the processing circuitry 172 determines that a measured air pressure is not similar to the expected pressure, at block 260, the processing circuitry 172 may cause the motor 160 to operate at a different speed. For example, the processing circuitry 172 may send a command to a VSD 162 to supply electric power to the motor 160 that has the determined electrical settings. For example, in response to a command or signal from the processing circuitry 172, the VSD 162 may alter a voltage, current, or frequency or electric power supplied to the motor 160. By altering the speed of the motor 160, the speed of the fan 150 may also change, which may enable the fan 150 to supply the amount of airflow indicated by the control device 190.

Accordingly, the present disclosure is directed to a furnace system that enables a constant amount of airflow to be provided to a conditioned space. For example, as a pressure of air within a furnace changes, a speed of a motor associated with a fan that supplies air to the conditioned space may be adjusted to maintain the amount of airflow being supplied to the conditioned space by the furnace system. As such, the presently disclosed furnace system may provide enhanced energy efficiency.

While only certain features and embodiments of the present disclosure have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the present disclosure. Furthermore, in an effort to provide a concise description of the exemplary embodiments, all features of an actual implementation may not have been described (i.e., those unrelated to the presently contemplated best mode of carrying out the present disclosure, or those unrelated to enabling the claimed embodiments). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A heating system, comprising:
   a furnace configured to heat air to be provided to a conditioned space;
   a pressure sensor configured to collect sensor data indicative of a pressure of air within the furnace;
   a fan configured to direct heated air to the conditioned space;
   a motor configured to drive the fan; and
   processing circuitry communicatively coupled to the pressure sensor and the motor, wherein the processing circuitry is configured to:
   determine an expected pressure based on a first amount of airflow called for by a control device and based on data defining expected pressure values with respective corresponding amounts of airflow called for by the control device;
   determine whether the pressure of air within the furnace is similar to the expected pressure; and
   adjust an operating speed of the motor based on a determination that the pressure of air within the furnace is not similar to the expected pressure such that a second amount of airflow supplied to the conditioned space is constantly supplied by the fan.

2. The heating system of claim 1, wherein the pressure sensor is disposed within a cabinet of the furnace and is configured to measure a pressure of air within the cabinet.

3. The heating system of claim 2, wherein the motor is disposed within the cabinet.

4. The heating system of claim 3, wherein the processing circuitry is disposed within the cabinet.

5. The heating system of claim 1, wherein the motor is a constant torque brushless direct current (DC) motor.

6. The heating system of claim 1, wherein the control device is a controller disposed within the conditioned space, and wherein the controller is communicatively coupled to the processing circuitry and configured to determine the first amount of airflow.

7. The heating system of claim 1, wherein the sensor data comprises a first set of sensor data and a second set of sensor data, wherein the processing circuitry is configured to:
   after receiving the first set of sensor data, cause the motor to operate at a first speed;
   after causing the motor to operate at the first speed, receive the second set of sensor data; and
   after receiving the second set of sensor data, cause the motor to operate at a second speed that is different from the first speed.

8. The heating system of claim 7, wherein the processing circuitry is configured to cause the motor to operate at the first speed by:
   determining settings of electric power to be supplied to the motor; and
   sending a signal to cause the motor to operate with the settings of electric power.

9. The heating system of claim 8, comprising a variable speed drive (VSD), wherein sending the signal to cause the motor to operate with the settings of electric power comprises sending the signal to the VSD, wherein the VSD is configured to cause the motor to operate with the settings of electric power based on the signal.

10. The heating system of claim 1, wherein the sensor data is indicative of a pressure of air at a portion of the furnace that, relative to an airflow, is downstream of the fan and upstream of a heat exchanger of the furnace.

11. The heating system of claim 10, wherein the processing circuitry is configured to determine a total external static pressure based on the sensor data.

12. The heating system of claim 10, wherein the processing circuitry is configured to determine an additional pressure of air associated with a portion of the heating system that, relative to the airflow, is downstream of the heat exchanger.

13. The heating system of claim 1, wherein the pressure sensor is the only sensor utilized to control the motor.

14. The heating system of claim 1, wherein the data defining expected pressure values with respective corresponding amounts of airflow comprises a look-up table, an algorithm, or both defining a relationship between the expected pressure values for the respective corresponding amounts of airflow called for by the control device.

15. A control board for a furnace, comprising:
processing circuitry configured to be communicatively coupled to a pressure sensor and a motor that are each disposed within a blower compartment of the furnace, wherein the processing circuitry is communicatively coupled to a control device configured to be disposed within a conditioned space and configured to determine an amount of airflow, and the processing circuitry is configured to:
receive sensor data from the pressure sensor, wherein the sensor data is indicative of a pressure within the furnace;
determine an expected pressure based on the amount of airflow determined by the control device and based on data associating a plurality of expected pressure values with respective corresponding amounts of airflow determined by the control device;
determine whether the pressure within the furnace is similar to the expected pressure; and
control the motor such that a blower driven by the motor supplies a constant amount of air to the conditioned space and such that the pressure within the furnace is within a threshold amount of the expected pressure.

16. The control board of claim 15, comprising a heat exchanger, wherein the blower is configured to motivate the air across the heat exchanger before supplying the air to the conditioned space.

17. The control board of claim 15, wherein the control device is configured to determine the amount of airflow based on user input.

18. The control board of claim 15, wherein the processing circuitry is configured to control the motor by executing an application, wherein the application comprises data indicative of electrical settings associated with the amount of airflow and the sensor data.

19. The control board of claim 18, wherein the processing circuitry is configured to cause the motor to be supplied with electric power having the electrical settings.

20. The control board of claim 15, wherein the processing circuitry is configured to alter a speed of the blower by causing a voltage of electric power supplied to the blower to be modified.

21. The control board of claim 15, wherein the conditioned space comprises a residential building.

22. A non-transitory computer-readable medium comprising instructions that, when executed by a processor, are configured to cause the processor to:
receive sensor data indicative of a pressure of air within a cabinet of a furnace from a pressure sensor;
receive an amount of airflow called for by a control device;
determine an expected pressure based on the amount of airflow received from the control device and based on data associating expected pressure values with respective corresponding amounts of airflow called for by the control device;
determine electrical settings based on the expected pressure and the data; and
adjust an operating speed of a constant torque brushless direct current motor to be supplied with electric power having the electrical settings such that a fan driven by the motor supplies a constant amount of airflow to a conditioned space and such that the pressure of air within the cabinet is within a threshold amount of the expected pressure.

23. The non-transitory computer-readable medium of claim 22, wherein the cabinet is configured to receive return air from ductwork of the conditioned space.

24. The non-transitory computer-readable medium of claim 23, wherein the furnace comprises a heat exchanger, wherein the fan is configured to drive supply air across the heat exchanger, resulting in heated air, wherein the fan is configured to supply the heated air to the conditioned space.

25. The non-transitory computer-readable medium of claim 22, wherein the instructions are configured to cause the processor to:
receive an additional amount of airflow called for by the control device; and
modify a speed of the fan based on the additional amount of airflow.

26. The non-transitory computer-readable medium of claim 22, wherein the furnace corresponds to an indoor unit of a heating, ventilation, and air conditioning (HVAC) system.

27. The non-transitory computer-readable medium of claim 22, wherein the furnace comprises a variable speed drive configured to supply the electric power to the motor.

28. The non-transitory computer-readable medium of claim 22, wherein the sensor data comprises a first set of sensor data and second set of sensor data, wherein the instructions are configured to cause the processor to:
determine a first set of electrical settings based on the expected pressure and the first set of sensor data;
cause the motor to be supplied with electric power having the first set of electrical settings;
determine a second set of electrical settings based on the expected pressure and the second set of sensor data; and
cause the motor to be supplied with electric power having the second set of electrical settings.

* * * * *